(12) United States Patent
Aritome et al.

(10) Patent No.: US 11,360,047 B2
(45) Date of Patent: Jun. 14, 2022

(54) CAPILLARY ELECTROPHORESIS DEVICE

(71) Applicant: Hitachi High-Technologies Corporation, Tokyo (JP)

(72) Inventors: Katsuhiro Aritome, Tokyo (JP);
Ryusuke Kimura, Tokyo (JP);
Motohiro Yamazaki, Tokyo (JP)

(73) Assignee: Hitachi High-Technologies Corporation, Tokyo (JP)

( * ) Notice: Subject to any disclaimer, the term of this patent is extended or adjusted under 35 U.S.C. 154(b) by 237 days.

(21) Appl. No.: 16/633,641

(22) PCT Filed: Jul. 31, 2017

(86) PCT No.: PCT/JP2017/027700
§ 371 (c)(1),
(2) Date: Jan. 24, 2020

(87) PCT Pub. No.: WO2019/026133
PCT Pub. Date: Feb. 7, 2019

(65) Prior Publication Data
US 2021/0156821 A1 May 27, 2021

(51) Int. Cl.
*G01N 27/447* (2006.01)
*G01N 27/416* (2006.01)

(52) U.S. Cl.
CPC ..... *G01N 27/44713* (2013.01); *G01N 27/416* (2013.01); *G01N 27/447* (2013.01);
(Continued)

(58) Field of Classification Search
CPC ........... G01N 27/447; G01N 27/44713; G01N 27/44747; G01N 27/44756; G01N 27/416; G01N 27/44704
See application file for complete search history.

(56) References Cited

U.S. PATENT DOCUMENTS

2002/0003091 A1   1/2002   Kojima et al.
2014/0202858 A1   7/2014   Onuma
(Continued)

FOREIGN PATENT DOCUMENTS

CN   103940887 A   7/2014
CN   104569115 A   4/2015
(Continued)

OTHER PUBLICATIONS

International Search Report (PCT/ISA/210) issued in PCT Application No. PCT/JP2017/027700 dated Oct. 24, 2017 with English translation (four (4) pages).
(Continued)

*Primary Examiner* — Luan V Van
*Assistant Examiner* — Caitlyn Mingyun Sun
(74) *Attorney, Agent, or Firm* — Crowell & Moring LLP (57) ABSTRACT

An electrophoresis device has: a sample tray (112) on which there are placed a positive-electrode-side buffer solution container (103) containing a buffer solution and a phoresis medium container (102) containing a phoresis medium, and which is driven in a vertical direction and a horizontal direction; a thermostat oven unit (113) that holds a capillary array having a capillary head in which a plurality of capillaries are bundled in a single unit at one end thereof in a state where the capillary array being held in a state in which the capillary head protrudes downward, and that keeps the interior temperature constant; a solution-delivering mechanism (106) for delivering the phoresis medium in the phoresis medium container to the capillary array from the capillary head; and a power source for applying a voltage to both ends of the capillary array. Holes for insertion of the capillary head are provided in upper sections of the positive-electrode-side buffer solution container and the phoresis medium container. The thermostat oven unit is provided
(Continued)

with a first lid member (207) that is positioned above the sample tray and seals the upper section of the positive-electrode-side buffer solution container while the phoresis medium is being delivered by the solution-delivering mechanism.

10 Claims, 10 Drawing Sheets

(52) U.S. Cl.
CPC . *G01N 27/44747* (2013.01); *G01N 27/44756* (2013.01); *G01N 27/44704* (2013.01)

(56) References Cited

U.S. PATENT DOCUMENTS

| | | | |
|---|---|---|---|
| 2016/0216235 A1* | 7/2016 | Miyata | G01N 27/44704 |
| 2018/0059055 A1* | 3/2018 | Kimura | G01N 27/44791 |
| 2018/0196001 A1 | 7/2018 | Okuno et al. | |

FOREIGN PATENT DOCUMENTS

| | | | | |
|---|---|---|---|---|
| JP | 57-185964 | A | 11/1982 | |
| JP | 5-126795 | A | 5/1993 | |
| JP | 2001-281221 | A | 10/2001 | |
| JP | 2001-324473 | A | 11/2001 | |
| JP | 2014-163714 | A | 9/2014 | |
| WO | WO 2016/157272 | A1 | 10/2016 | |
| WO | WO-2016157272 | A1 * | 10/2016 | ....... G01N 27/44721 |
| WO | WO 2017/002239 | A1 | 1/2017 | |

OTHER PUBLICATIONS

Japanese-language Written Opinion (PCT/ISA/237) issued in PCT Application No. PCT/JP2017/027700 dated Oct. 24, 2017 (four (4) pages).
Chinese-language Office Action issued in Chinese Application No. 201780093256.3 dated Jan. 12, 2022 (seven (7) pages).

* cited by examiner

CAPILLARY ELECTROPHORESIS DEVICE

TECHNICAL FIELD

The present invention relates to a capillary electrophoresis device, and more particularly to a capillary electrophoresis device including a solution evaporation prevention mechanism.

BACKGROUND ART

In recent years, a capillary electrophoresis device in which a capillary is filled with a phoresis medium such as a polymer gel and a polymer solution is widely used as an electrophoresis device. For example, the capillary electrophoresis device as disclosed in JP-A-2001-281221 (PTL 1) and JP-A-2001-324473 (PTL 2) is used in a related art. This capillary electrophoresis device has higher heat dissipation than that of a flat plate type electrophoresis device and can apply a higher voltage to a sample, thereby having an advantage of being able to perform electrophoresis at a high speed. There are also many advantages such as completion with a small amount of sample, automatic filling of the phoresis medium, and automatic sample injection, thereby being used for various separation analysis measurements including analysis of nucleic acid and protein.

An upper surface side of a buffer solution container is covered with a rubber sheet referred to as septa as disclosed in JP-A-2014-163714 (PTL 3). A notch is formed in the septa and when a capillary end section is inserted into the septa, the notch is expanded by pressing and thus the capillary end section is inserted into the buffer solution container. When the capillary end section is not inserted thereinto, the notch of the septa is in a state of being closed, whereby the buffer solution inside the container can be prevented from evaporating.

CITATION LIST

Patent Literature

PTL 1: JP-A-2001-281221
PTL 2: JP-A-2001-324473
PTL 3: JP-A-2014-163714

SUMMARY OF INVENTION

Technical Problem

When the capillary end section is inserted into the septa, and when the notch is expanded by the pressing, the capillary end section is rubbed against the notch. A foreign substance is generated by this rubbing, and when the foreign substance is mixed into the solution, an analysis error occurs. Therefore, in the capillary end section, particularly in a positive-electrode-side buffer solution container and a phoresis medium container into which a capillary head is inserted, it is required to provide a hole through which the capillary head penetrates in order to prevent the generation of the foreign substance caused by the rubbing against the capillary head. However, when there is the hole in an upper section of the container, the solution inside the container evaporates and thus the concentration of the solution changes, such that analysis performance deteriorates. Accordingly, it is required to provide a device which prevents the evaporation of the phoresis medium and the buffer solution while a series of analysis operations are performed, and whose analysis performance does not deteriorate.

Solution to Problem

According to one aspect of the present invention, an electrophoresis device includes: a sample tray on which a positive-electrode-side buffer solution container containing a buffer solution and a phoresis medium container containing a phoresis medium are placed, and which is driven in a vertical direction and a horizontal direction; a thermostat oven unit that holds a capillary array having a capillary head in which a plurality of capillaries are bundled in a single unit at one end thereof in a state where the capillary head protrudes downward, and that keeps an interior temperature constant; a solution-delivering mechanism for delivering the phoresis medium in the phoresis medium container to the capillary array from the capillary head; and a power source for applying a voltage to both ends of the capillary array, in which holes for insertion of the capillary head are provided in upper sections of the positive-electrode-side buffer solution container and the phoresis medium container, and the thermostat oven unit includes a first lid member that is positioned above the sample tray and seals the upper section of the positive-electrode-side buffer solution container while the phoresis medium is being delivered by the solution-delivering mechanism.

Advantageous Effects of Invention

It is possible to provide a device not only capable of preventing evaporation from a positive-electrode-side buffer solution container, but also capable of preventing deterioration of analysis performance.

A problem, a configuration, and an effect other than those described above will be clarified by the description of the following embodiments.

DESCRIPTION OF EMBODIMENTS

Hereinafter, an embodiment of the present invention will be described with reference to the drawings.

Figure 1:
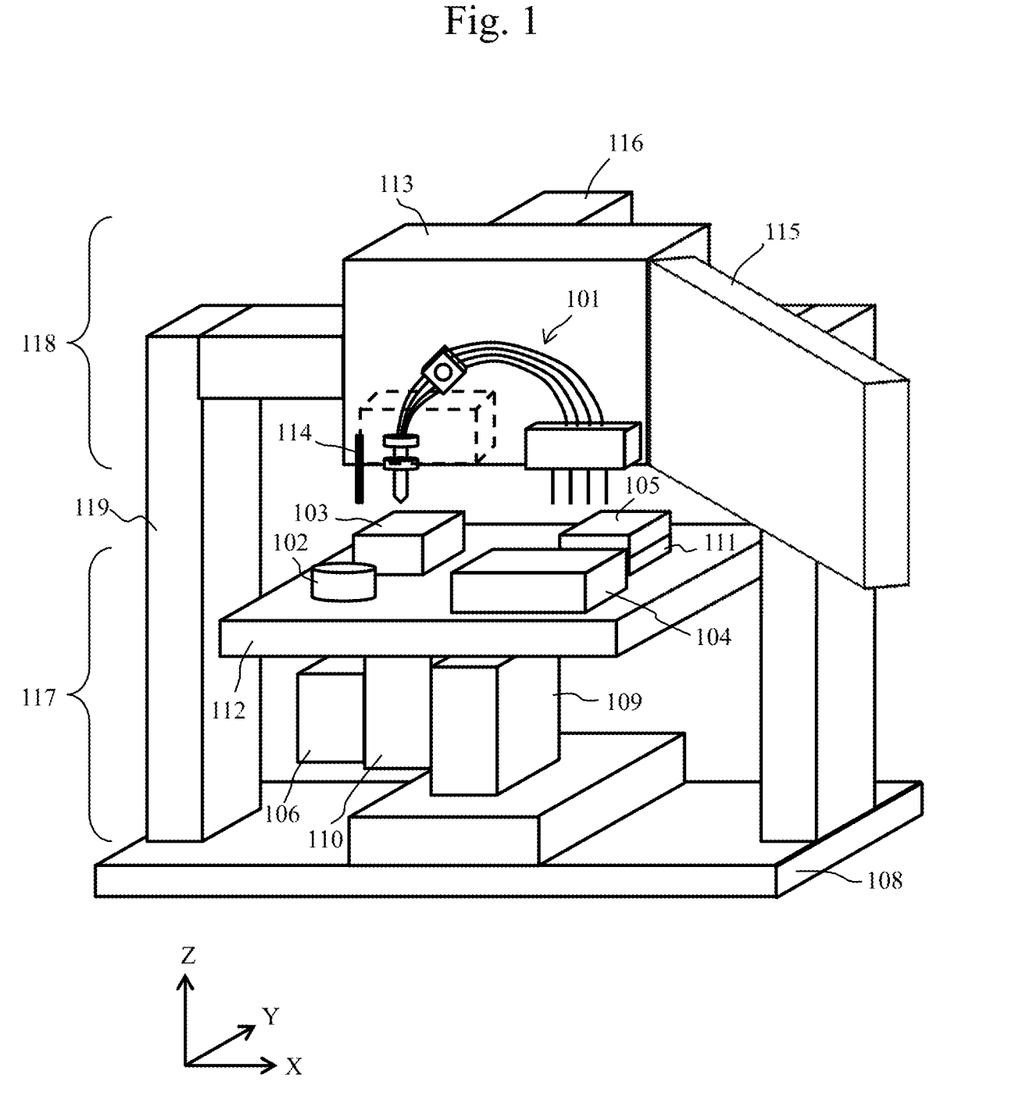
FIG. 1 is a perspective view illustrating a device configuration example of a capillary electrophoresis device.

FIG. 1 is a perspective view illustrating a device configuration example of an embodiment of a capillary electrophoresis device. The capillary electrophoresis device of the embodiment is roughly divided into two units: an autosampler unit 117 at a lower section of the device and an irradiation detection and thermostat oven unit 118 at an upper section of the device.

The autosampler unit 117 includes a Y-axis drive body 109 mounted on a sampler base 108, a Z-axis drive body 110 mounted on the Y-axis drive body 109, and a sample tray 112 mounted on the Z-axis drive body 110. A phoresis medium container 102, a positive-electrode-side buffer solution container 103, a negative-electrode-side buffer solution container 104, and a sample container 105 are placed on the sample tray 112 by a user. The sample container 105 is set on an X-axis drive body 111 mounted on the sample tray 112. A solution-delivering mechanism 106 is also mounted on the Z-axis drive body 110. The solution-delivering mechanism 106 is disposed below the phoresis medium container 102. The sample tray 112 is driven by the Y-axis drive body 109 in a Y-axis direction, that is, driven in a horizontal direction connecting the phoresis medium container 102 and the positive-electrode-side buffer solution container 103, and driven by the Z-axis drive body 110 in a Z-axis direction, that is, driven in a vertical direction. On the sample tray 112, only the sample container 105 can be driven by the X-axis drive body 111 in an X-axis direction.

The irradiation detection and thermostat oven unit 118 fixed to the sampler base 108 by a support column 119 includes a thermostat oven unit 113 and an irradiation detection unit 116. The thermostat oven unit 113 includes a thermostat oven main body and an opening and closing door 115, and the temperature inside the thermostat oven unit 113 can be kept constant by closing the opening and closing door 115. The irradiation detection unit 116 is mounted behind the thermostat oven unit 113, and can perform detection during the electrophoresis. A capillary array 101 is set in the thermostat oven unit 113, and a sample is electrophoresed while keeping the capillary array 101 at a constant temperature in the thermostat oven unit 113, whereby the detection is performed by the irradiation detection unit 116. An electrode 114 for dropping the capillary head side to GND when a high voltage for the electrophoresis is applied is also mounted on the thermostat oven unit 113.

As described above, the capillary array 101 is fixed to the thermostat oven unit 113. The phoresis medium container 102, the positive-electrode-side buffer solution container 103, the negative-electrode-side buffer solution container 104, and the sample container 105 mounted on the sample tray 112 can be driven in the Y-axis direction and the Z-axis direction by the autosampler unit 117, and only the sample container 105 can be further driven in the X-axis direction. The movement of the autosampler unit 117 allows the phoresis medium container 102, the positive-electrode-side buffer solution container 103, the negative-electrode-side buffer solution container 104, and the sample container 105 to be automatically connected to the fixed capillary array 101.

Figure 2:
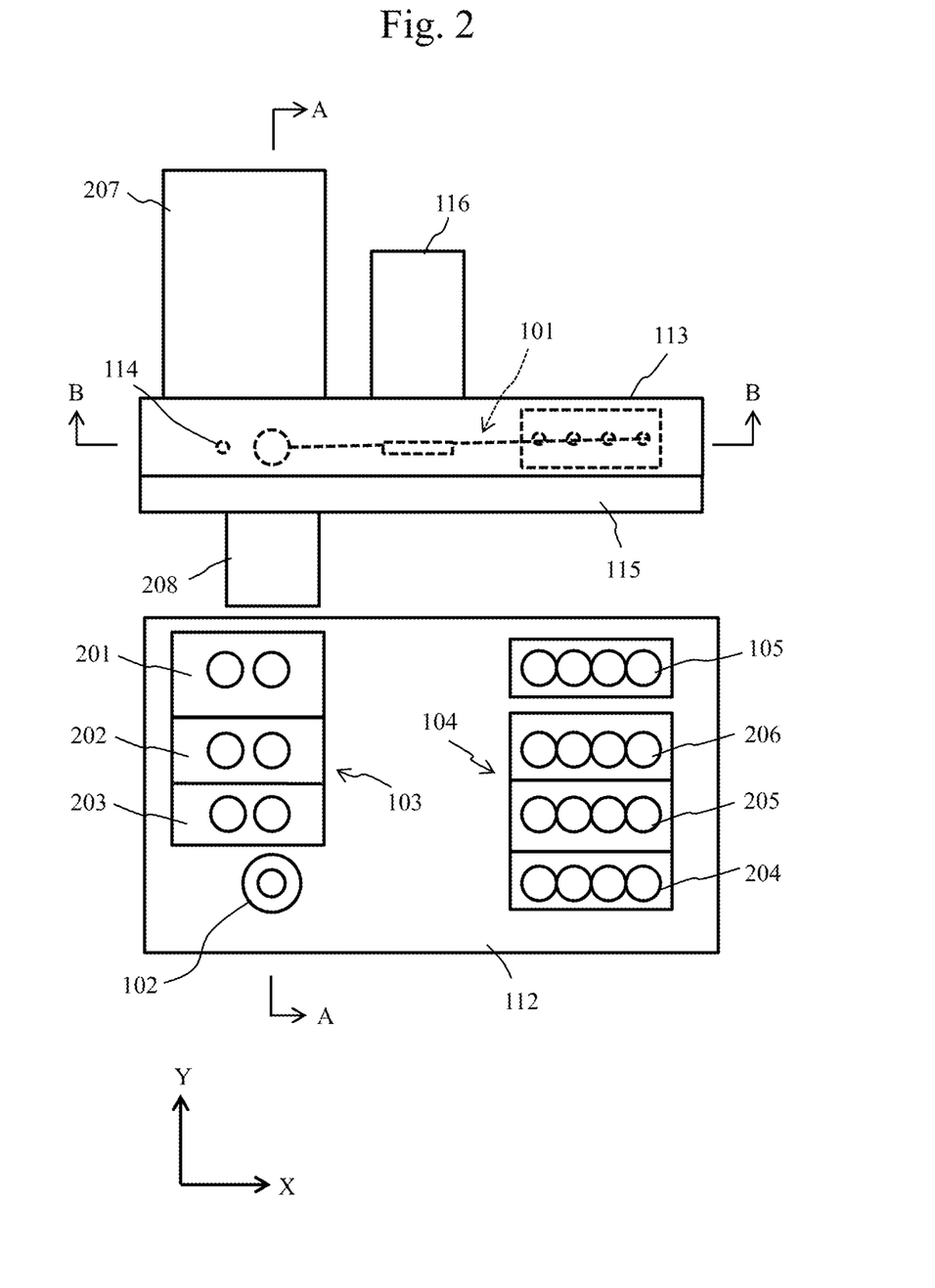
FIG. 2 is a schematic top view of the capillary electrophoresis device of an embodiment when viewed from above.

FIG. 2 is a schematic top view of the capillary electrophoresis device of the embodiment when viewed from above. The opening and closing door 115 is closed. In the positive-electrode-side buffer solution container 103 which is set on the sample tray 112, a positive-electrode-side sample introduction buffer solution tank 201, a positive-electrode-side electrophoresis buffer solution tank 202, and a positive-electrode-side washing tank 203 are disposed to be partitioned from each other. In the negative-electrode-side buffer solution container 104, a waste solution tank 204, a negative-electrode-side washing tank 205, and a negative-electrode-side electrophoresis buffer solution tank 206 are disposed. In the thermostat oven unit 113, in order to prevent evaporation of the solution from the phoresis medium container 102 and the positive-electrode-side buffer solution container 103, a phoresis medium container lid 208 and a positive-electrode-side buffer solution container lid 207 for preventing the evaporation respectively corresponding thereto are provided.

In the embodiment, the phoresis medium container 102, the positive-electrode-side buffer solution container 103, the negative-electrode-side buffer solution container 104, and the sample container 105 are disposed in a positional relationship as illustrated in the drawing. Accordingly, the positional relationship between the positive-electrode-side and the negative-electrode-side when connected to the capillary array 101 is formed as follows: the phoresis medium container 102—the waste solution tank 204; the positive-electrode-side washing tank 203—the negative-electrode-side washing tank 205; the positive-electrode-side electrophoresis buffer solution tank 202—the negative-electrode-side electrophoresis buffer solution tank 206; and the positive-electrode-side sample introduction buffer solution tank 201—the sample container 105.

Figure 3:
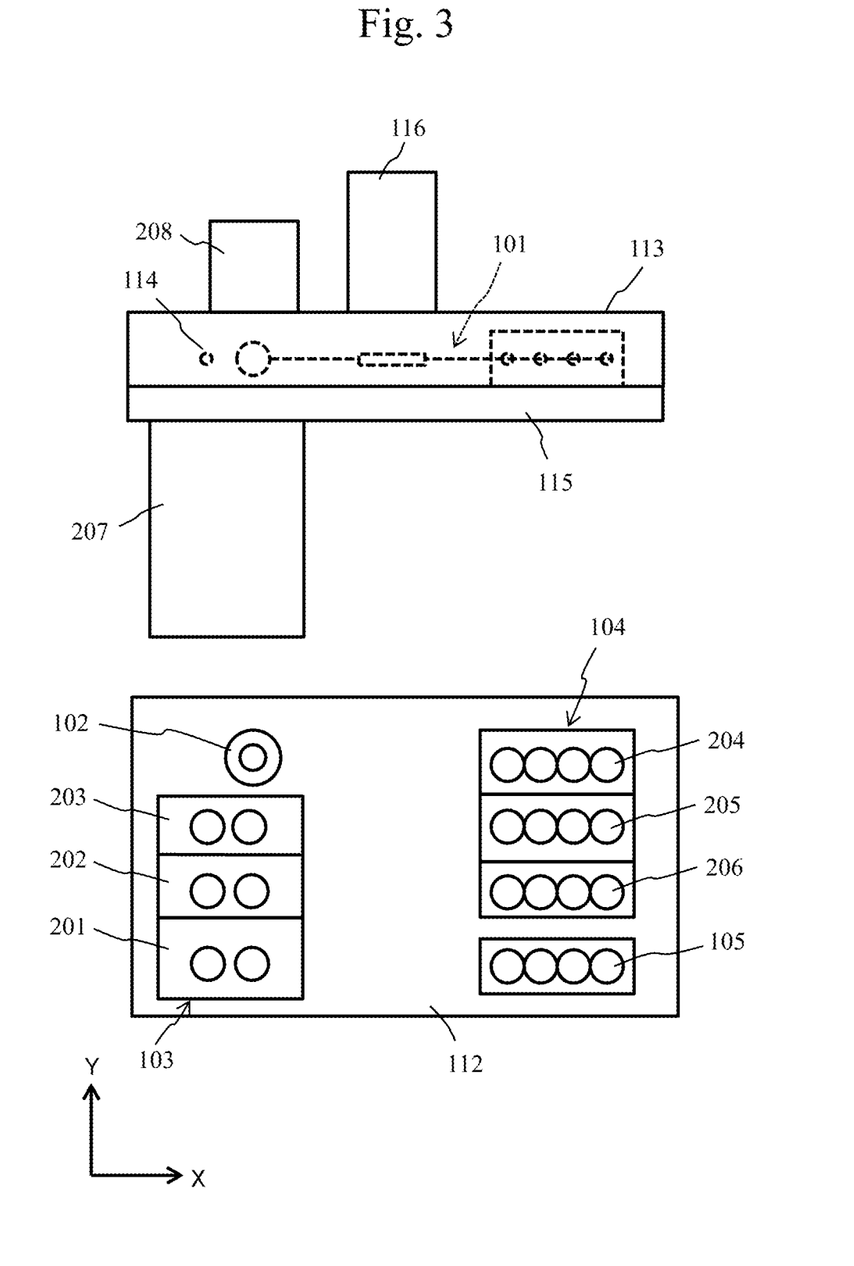
FIG. 3 is a schematic top view illustrating another example of the capillary electrophoresis device.

FIG. 3 illustrates a schematic top view of another embodiment of the capillary electrophoresis device, and the phoresis medium container 102, the positive-electrode-side buffer solution container 103, the negative-electrode-side buffer solution container 104, and the sample container 105 are disposed on the sample tray 112 in a different positional relationship from that of FIG. 2. Since the positional relationship in the Y-axis direction between the phoresis medium container 102 and the positive-electrode-side buffer solution container 103 is reversed to that of FIG. 2, the positional relationship between the phoresis medium container lid 208 and the positive-electrode-side buffer solution container lid 207 provided in the thermostat oven unit 113 is also reversed to that of FIG. 2. The positional relationship between the positive-electrode-side and the negative-electrode-side when connected to the capillary array 101 is the same as that in the case of FIG. 2, and is formed as follows: the phoresis medium container 102—the waste solution tank 204; the positive-electrode-side washing tank 203—the negative-electrode-side washing tank 205; the positive-electrode-side electrophoresis buffer solution tank 202—the negative-electrode-side electrophoresis buffer solution tank 206; and the positive-electrode-side sample introduction buffer solution tank 201—the sample container 105.

In the example illustrated in FIG. 2, the positive-electrode-side buffer solution container lid 207 is mounted on a main body of the thermostat oven unit 113, and the phoresis medium container lid 208 is mounted on the opening and closing door 115. In the example illustrated in FIG. 3, the positive-electrode-side buffer solution container lid 207 is mounted on the opening and closing door 115, and the phoresis medium container lid 208 is mounted on the main body of the thermostat oven unit 113. Although not illustrated in the drawing, a structure in which both the positive-electrode-side buffer solution container lid 207 and the phoresis medium container lid 208 are mounted on the main body of the thermostat oven unit 113 or both the positive-electrode-side buffer solution container lid 207 and the phoresis medium container lid 208 are mounted on the opening and closing door 115 may be used.

Here, as a typical example, an embodiment in which the phoresis medium container lid 208 is provided with respect to the phoresis medium container 102 and the positive-electrode-side buffer solution container lid 207 is provided with respect to the positive-electrode-side buffer solution container 103 is described, but both the phoresis medium container lid 208 and the positive-electrode-side buffer solution container lid 207 are not necessarily required to be provided. That is, for example, even in a configuration in which the phoresis medium container lid 208 is omitted and the positive-electrode-side buffer solution container lid 207 is only provided with respect to the positive-electrode-side buffer solution container 103, at least an effect of preventing evaporation of the solution from the positive-electrode-side buffer solution container 103 can be obtained. In the same manner, even in a configuration in which the positive-electrode-side buffer solution container lid 207 is omitted and the phoresis medium container lid 208 is only provided with respect to the phoresis medium container 102, at least an effect of preventing evaporation of the solution from the phoresis medium container 102 can be obtained.

Figure 4:
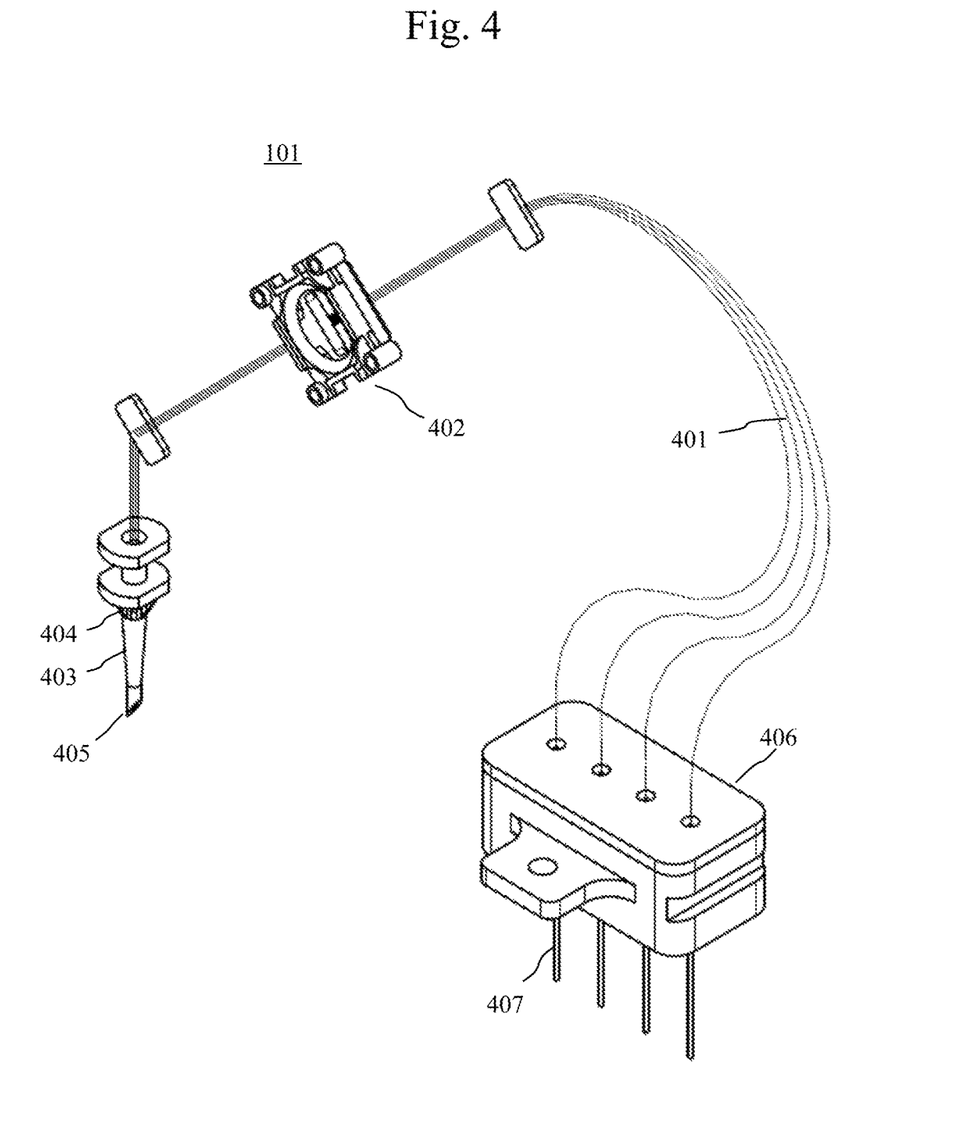
FIG. 4 is a schematic view illustrating a detailed example of a capillary array.

FIG. 4 is a schematic view illustrating a detailed example of the capillary array. The capillary array 101 includes a plurality of capillaries 401 that are glass tubes having an inner diameter of about 50 μm. The plurality of capillaries 401 are disposed in alignment on a plane in a detection section 402. The irradiation detection unit 116 irradiates the plurality of capillaries arranged in the detection section 402 with light, and detects fluorescence to be generated from a sample that is electrophoresed in each capillary. A load header 406 and an SUS pipe 407 are attached to a negative-electrode-side end section of the capillary array 101. As a material of the load header 406, for example, a PBT resin which is a resin having a high insulation characteristic and a high comparison tracking index is desirable. A part for conducting all the SUS pipes 407 is incorporated in the load header 406, and a high voltage is applied to all the SUS pipes 407 by applying the high voltage thereto. The capillaries 401 respectively pass through the SUS pipe 407 and are fixed thereto. At a positive-electrode-side end section of the capillary array 101, the plurality of capillaries 401 are bundled together by a capillary head 403. The capillary head 403 includes a capillary head tip 405 having an acute angle and a needle shape, and a capillary head boss 404 having an outer diameter larger than that of the capillary head tip 405. As a material of the capillary head 403, a PEEK resin which is a resin that is hardly broken and also has rigidity and is highly stable against chemicals and analysis is desirable.

When the capillary array 101 is mounted on the thermostat oven unit 113, the detection section 402, the load header 406, and the capillary head 403 are respectively fixed to the thermostat oven unit 113. The detection section 402 is positioned with high accuracy to be at a position which can be detected by the irradiation detection unit 116. The load header 406 is fixed to be electrically connected to a place to which the high voltage is applied. The capillary head 403 is firmly fixed to the thermostat oven unit 113 so that the capillary head tip 405 faces directly downward and can withstand a load. The positional relationship between the positive-electrode-side and the negative-electrode-side at the time of fixation is arranged for the plurality of capillaries 401 to not overlap each other when being set in the device.

Figure 5:
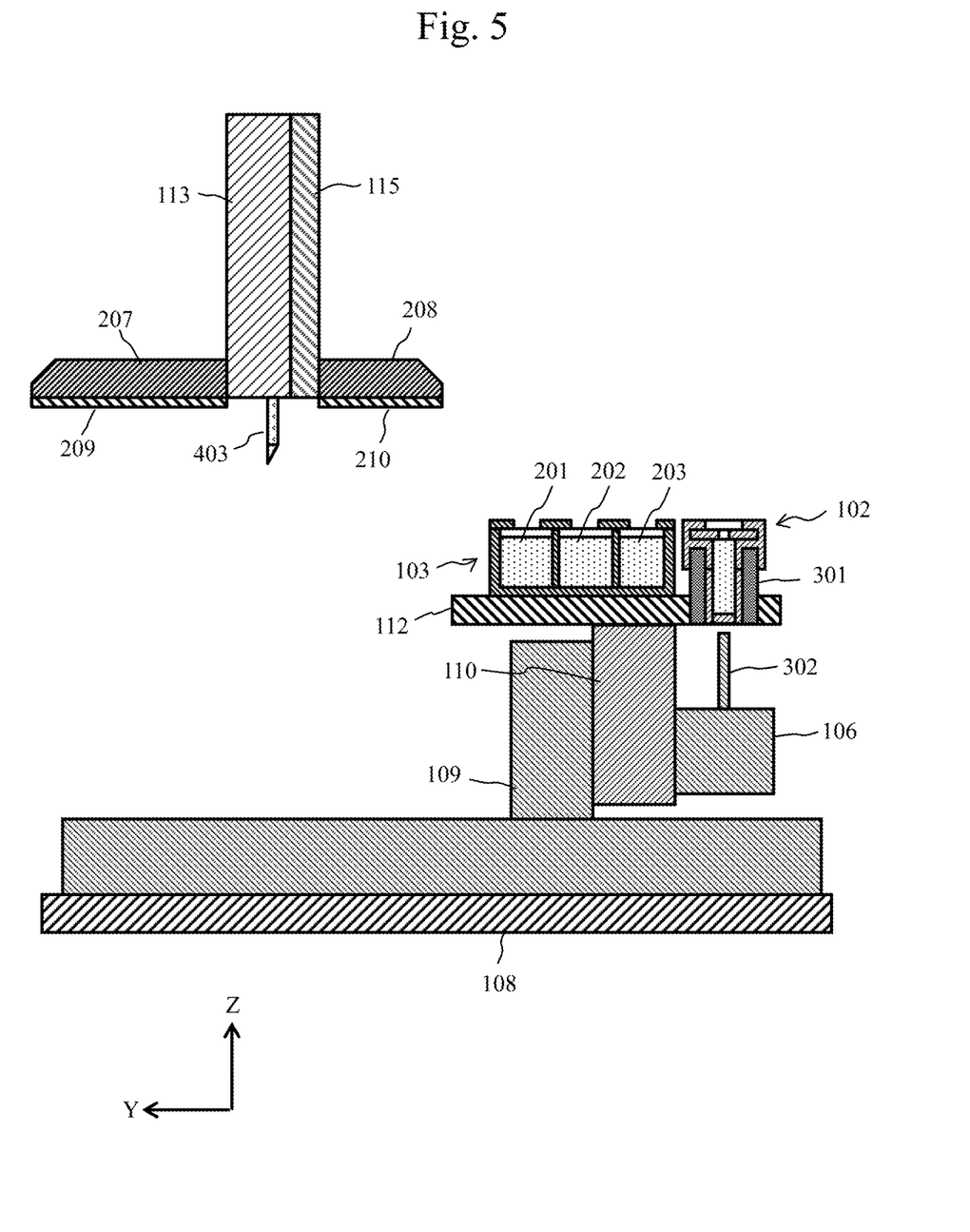
FIG. 5 is a schematic view illustrating a cross section taken along the line A-A of FIG. 2.

FIG. 5 is a schematic view illustrating a cross-section taken along the line A-A of FIG. 2. The phoresis medium container 102 is inserted into a guide 301 embedded in the sample tray 112, thereby being set. The solution-delivering mechanism 106 is disposed so that a plunger 302 incorporated in the solution-delivering mechanism 106 is positioned below the phoresis medium container 102.

Figure 6:
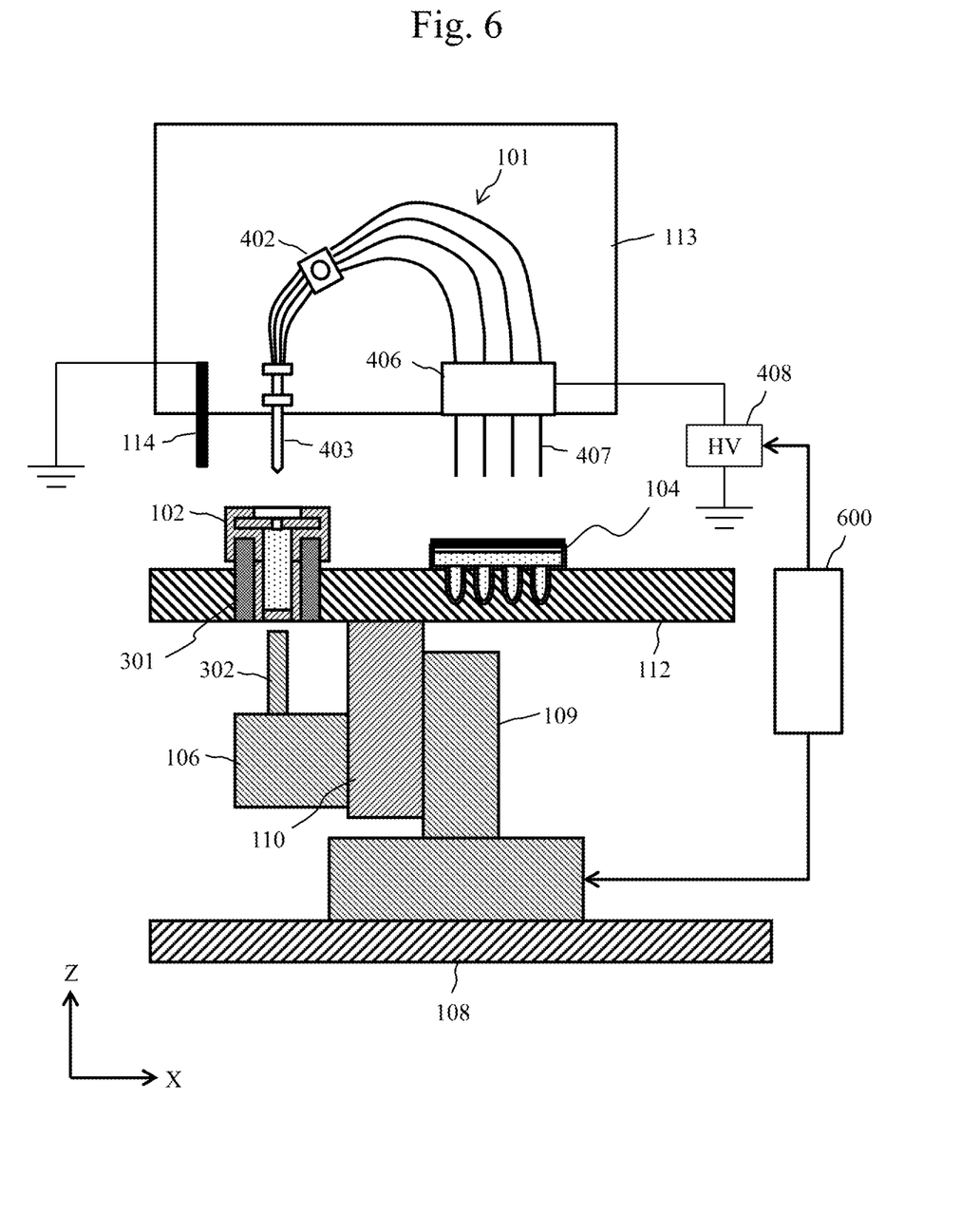
FIG. 6 is a schematic view illustrating a cross section taken along the line B-B of FIG. 2.

FIG. 6 is a schematic view illustrating a cross section taken along the line B-B of FIG. 2. From a lower surface of the thermostat oven unit 113, the capillary head 403 of the capillary array 101, the plurality of SUS pipes 407 into which the capillaries are respectively inserted, and the electrode 114 protrude downward. At the time of electrophoresis, the right side in FIG. 6 of the capillary array 101 becomes the negative-electrode-side and the left side thereof becomes the positive-electrode-side. The row of the positive-electrode-side electrophoresis buffer solution tank 202 and the negative-electrode-side electrophoresis buffer solution tank 206 are positioned below the thermostat oven unit 113 by the autosampler unit 117; the capillary head 403 and the electrode 114 are respectively inserted into two holes provided in an upper section of the positive-electrode-side electrophoresis buffer solution tank 202; and the SUS pipe 407 into which the capillaries are inserted is inserted into the negative-electrode-side electrophoresis buffer solution tank 206. The buffer solution in the positive-electrode-side electrophoresis buffer solution tank 202 into which the capillary head 403 is inserted is grounded by the electrode 114. A negative high voltage is applied from a power source 408 to the other end of each capillary via the load header 406 and the SUS pipe 407, whereby a sample introduced to the negative-electrode-side tip of each capillary is moved in the capillary by electrophoresis and is detected by the detection section 402. The Y-axis drive body 109, the Z-axis drive body 110, the X-axis drive body 111, the solution-delivering mechanism 106, and the power source 408 of the autosampler unit 117 are controlled by the control section 600.

Figure 7:
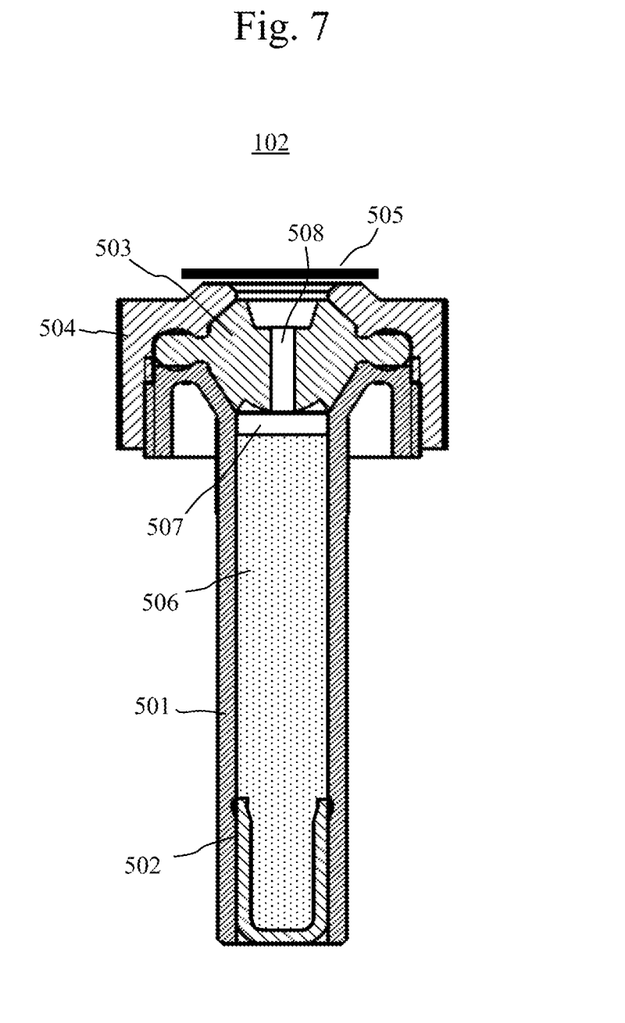
FIG. 7 is a schematic cross-sectional view illustrating a detailed example of a phoresis medium container.

FIG. 7 is a schematic cross-sectional view illustrating a detailed example of the phoresis medium container. In the phoresis medium container 102, a recessed seal 502 is incorporated in a syringe 501, and a rubber plug 503 is placed from above and sealed with a cap 504. A top of the cap 504 is further sealed with a film 505. A material of the syringe 501 is desirably a PP resin capable of being thinly molded. A material of the seal 502 is desirably a superpolymer PE resin which is often used for sealing a fluid in a sliding section and is excellent in sliding characteristics. A material of the rubber plug 503 is desirably silicon rubber which is stable for analysis. A through hole 508 through which the capillary head 403 of the capillary array 101 can penetrate is provided in advance in the rubber plug 503. Since a material of the cap 504 is unified with the film 505 of each container, a PC resin is desirable. A phoresis medium 506 is sealed in the phoresis medium container 102, and air 507 entering at the time of sealing is sealed to be accumulated in an upper section. A gel or a polymer is used as the phoresis medium 506, and a capacity capable of performing a plurality of times of analysis is sealed. The seal 502 can move inside the syringe 501 by applying a load from the outside by the plunger 302 of the solution-delivering mechanism 106.

Figure 8:
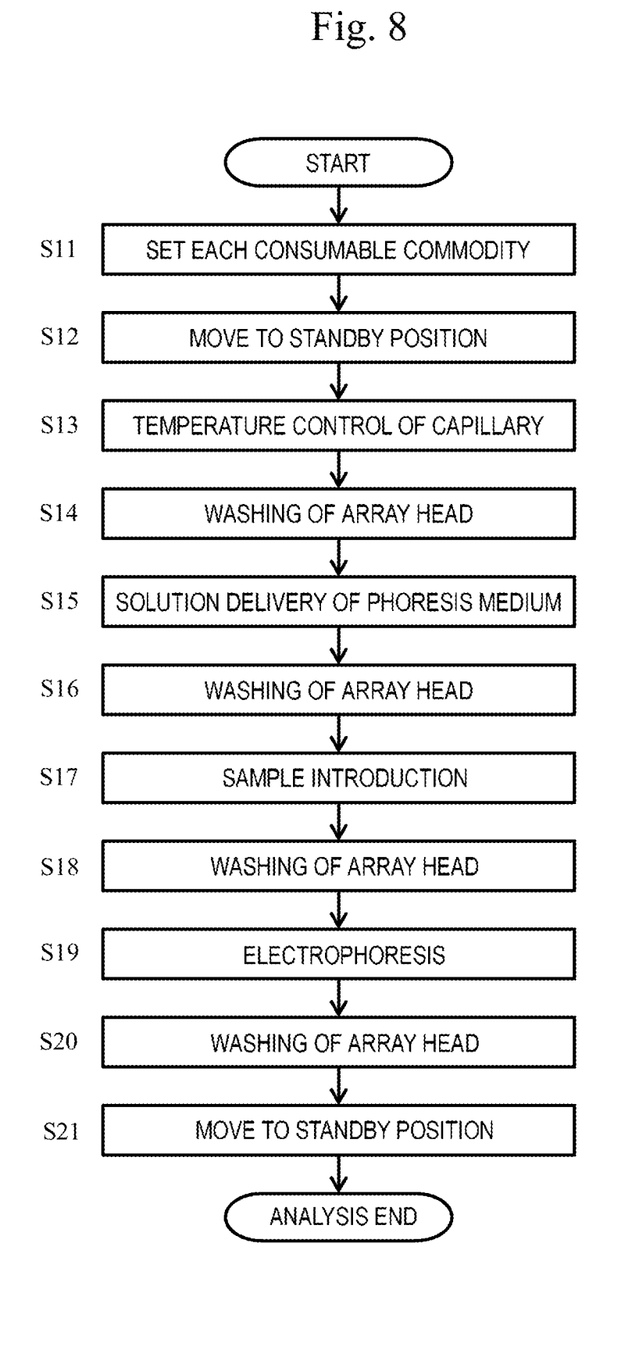
FIG. 8 is a flowchart illustrating an operation procedure for electrophoresis analysis.
Figure 9:
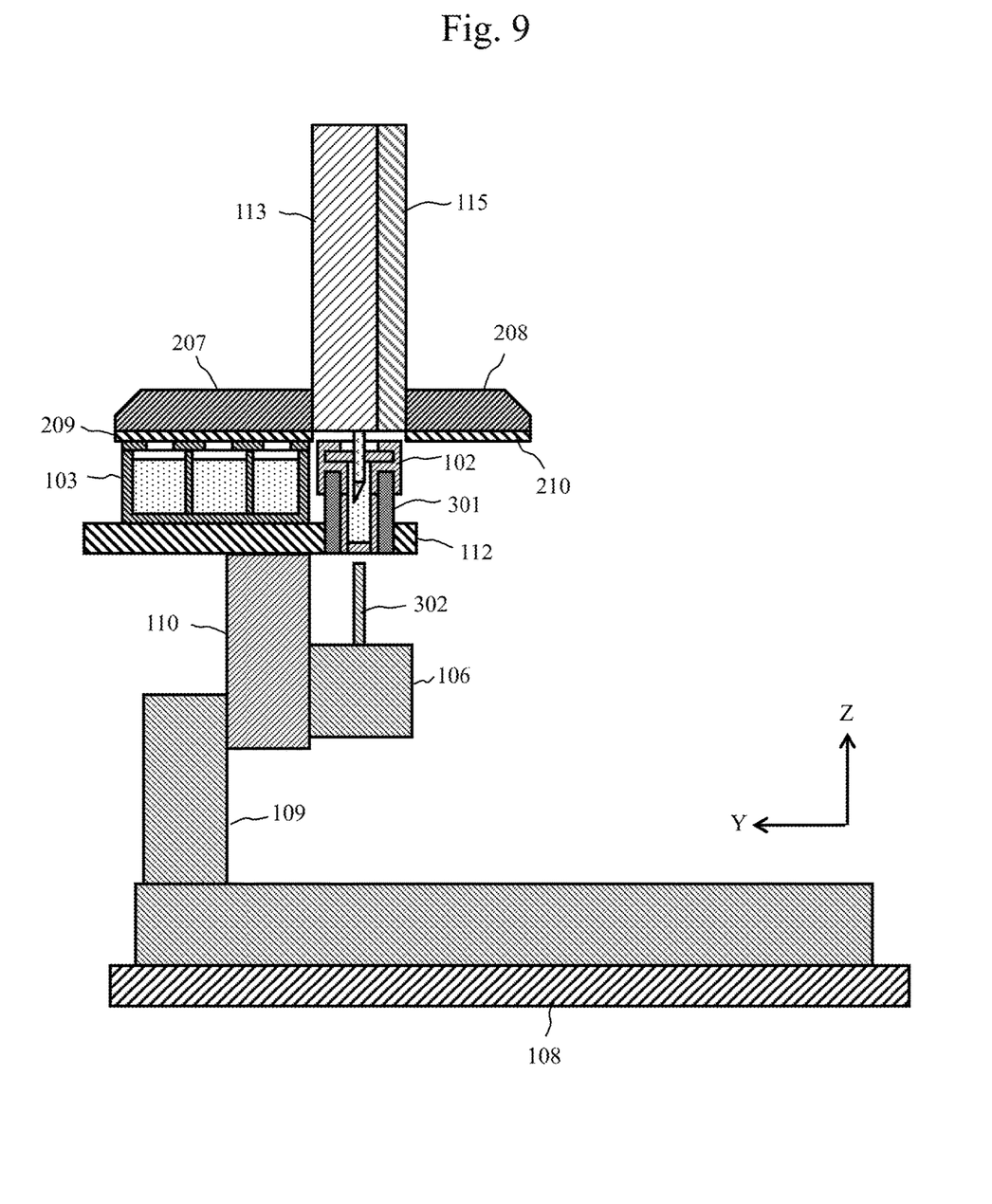
FIG. 9 is a schematic cross-sectional view illustrating a positional relationship between an autosampler and a thermostat oven unit in a phoresis medium solution-delivering process.
Figure 10:
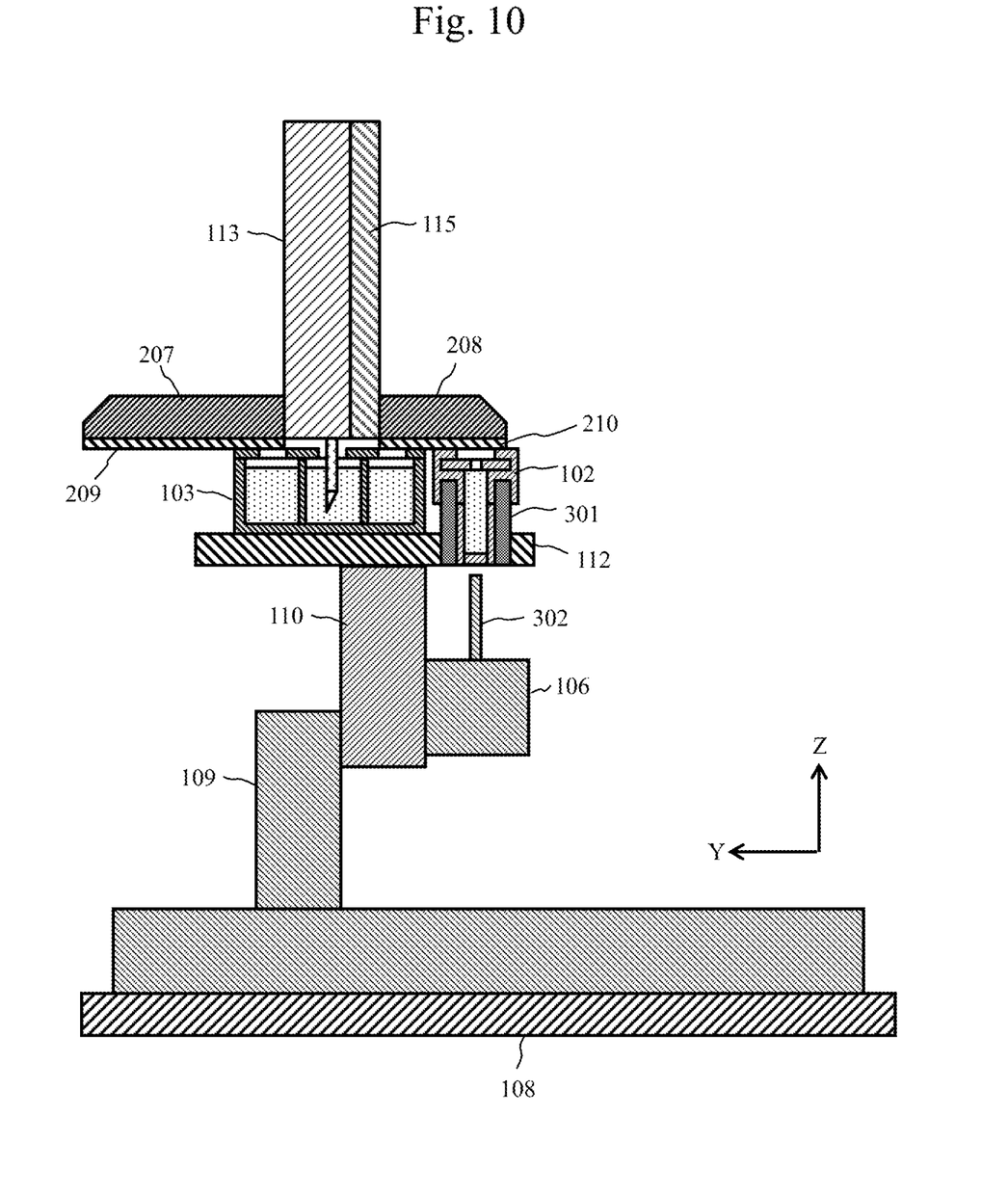
FIG. 10 is a schematic cross-sectional view illustrating a positional relationship between the autosampler and the thermostat oven unit in an electrophoresis process.

Hereinafter, an operation procedure for analysis in the embodiment will be described. FIG. 8 is a flowchart illustrating an operation procedure for electrophoresis analysis. FIG. 9 is a schematic cross-sectional view illustrating a positional relationship between a sample tray, a thermostat oven unit, and a lid mechanism in a phoresis medium solution-delivering process, and FIG. 10 is a schematic cross-sectional view illustrating a positional relationship between the sample tray, the thermostat oven unit, and the lid mechanism in an electrophoresis process.

In step S11, a user sets the capillary array 101 to the thermostat oven unit 113. The user places and sets the phoresis medium container 102, the positive-electrode-side buffer solution container 103, the negative-electrode-side buffer solution container 104, and the sample container 105 on the sample tray 112. ID information such as a bar code is imparted to the capillary array 101, the phoresis medium container 102, the positive-electrode-side buffer solution container 103, the negative-electrode-side buffer solution container 104, and the sample container 105 which are consumable commodities. When setting each consumable commodity in the device, the user reads the ID information of each consumable commodity by a bar code reader mounted on the device. Thus, a production number, an expiration date, and the number of times of use of each consumable commodity can be managed.

In step S12, the control section 600 drives the Y-axis drive body 109 and the Z-axis drive body 110 of the autosampler unit 117, after which the capillary head 403 and the SUS pipe 407 of the capillary array 101 are respectively inserted into the positive-electrode-side electrophoresis buffer solution tank 202 and the negative-electrode-side electrophoresis buffer solution tank 206. Here, the phoresis medium container lid 208 and the positive-electrode-side buffer solution container lid 207 for preventing evaporation are arranged at an upper section of the positive-electrode-side sample introduction buffer solution tank 201 of the phoresis medium container 102 and the positive-electrode-side buffer solution container 103. The positive-electrode-side buffer solution container lid 207 and the phoresis medium container lid 208 are provided with viscoelastic sheets 209 and 210 such as rubber on a lower surface in contact with the container. The sample tray 112 is driven upward by a Z-axis drive force of the autosampler unit 117; the viscoelastic sheets 209 and 210 are crushed by pressing the positive-electrode-side buffer solution container 103 and the phoresis medium container 102 against the positive-electrode-side buffer solution container lid 207 and the phoresis medium container lid 208 from below; and the phoresis medium container 102 and the positive-electrode-side buffer solution container 103 can be sealed.

In step S13, the capillary array 101 set inside is kept at a constant temperature by the thermostat oven unit 113.

In step S14, the control section 600 drives the Y-axis drive body 109 and the Z-axis drive body 110 of the autosampler unit 117, after which the capillary head 403 and the SUS pipe 407 of the capillary array 101 are respectively inserted into the positive-electrode-side washing tank 203 and the negative-electrode-side washing tank 205. Accordingly, the washing of the capillary head 403 and the SUS pipe 407 is performed.

In step S15, the control section 600 drives the Y-axis drive body 109 and the Z-axis drive body 110 of the autosampler unit 117, after which the capillary head 403 and the SUS pipe 407 of the capillary array 101 are respectively inserted into the phoresis medium container 102 and the waste solution tank 204. FIG. 9 is a cross-sectional schematic view illustrating a cross section taken along the line A-A of FIG. 2 here. The control section 600 drives the solution-delivering mechanism 106, and presses and slides the seal 502 of the phoresis medium container 102 upward by the plunger 302, thereby delivering the phoresis medium 506 sealed in the phoresis medium container 102 to individual capillary 401 via the capillary head 403. Here, as described in FIG. 9, the positive-electrode-side buffer solution container lid 207 for preventing evaporation is positioned at the upper section of the positive-electrode-side sample introduction buffer solution tank 201 of the positive-electrode-side buffer solution container 103. The sample tray 112 is driven upward by the Z-axis drive body 110, and an upper section of the positive-electrode-side buffer solution container 103 is pressed against a lower surface of the positive-electrode-side buffer solution container lid 207. The viscoelastic sheet 209 provided on the lower surface of the positive-electrode-side buffer solution container lid 207 that contacts the positive-electrode-side buffer solution container 103 is crushed by contacting an upper surface of the positive-electrode-side buffer solution container 103 by the Z-axis drive force of the autosampler unit 117, and thus the positive-electrode-side buffer solution container 103 is sealed. As a result, evaporation of the buffer solution from the positive-electrode-side sample introduction buffer solution tank 201 and the positive-electrode-side electrophoresis buffer solution tank 202 is prevented.

In step S16, the control section 600 drives the Y-axis drive body 109 and the Z-axis drive body 110 of the autosampler unit 117 again, after which the capillary head 403 and the SUS pipe 407 of the capillary array 101 are respectively inserted into the positive-electrode-side washing tank 203 and the negative-electrode-side washing tank 205. Accordingly, the capillary head 403 and the SUS pipe 407 are washed.

In step S17, the control section 600 drives the Y-axis drive body 109 and the Z-axis drive body 110 of the autosampler unit 117, after which the capillary head 403 and the SUS pipe 407 of the capillary array 101 are respectively inserted into the positive-electrode-side sample introduction buffer solution tank 201 and the sample container 105. Here, the electrode 114 is also inserted into the positive-electrode-side sample introduction buffer solution tank 201. Accordingly, both ends of the capillary 401 are conducted. Here, the control section 600 controls the power source 408 to apply a high voltage to the capillary array 101, and introduces a sample to the tip of each capillary 401.

In step S18, the control section 600 drives the Y-axis drive body 109 and the Z-axis drive body 110 of the autosampler unit 117 again, after which the capillary head 403 and the SUS pipe 407 of the capillary array 101 are respectively inserted into the positive-electrode-side washing tank 203 and the negative-electrode-side washing tank 205. Accordingly, the capillary head 403 and the SUS pipe 407 are washed.

In step S19, the control section 600 drives the Y-axis drive body 109 and the Z-axis drive body 110 of the autosampler unit 117 again, after which the capillary head 403 and the SUS pipe 407 of the capillary array 101 are respectively inserted into the positive-electrode-side electrophoresis buffer solution tank 202 and the negative-electrode-side electrophoresis buffer solution tank 206. FIG. 10 is a schematic view of a cross section taken along the line A-A of FIG. 2 here. The electrode 114 is also inserted into the positive-electrode-side electrophoresis buffer solution tank 202. Accordingly, both ends of the capillary 401 are conducted. Here, the control section 600 controls the power source 408 to apply the high voltage to the capillary array 101, whereby electrophoresis is performed. The irradiation detection unit 116 detects a sample electrophoresed through each capillary. Here, as illustrated in FIG. 10, the phoresis medium container lid 208 for preventing evaporation is positioned at an upper section of the phoresis medium container 102. The sample tray 112 is driven upward by the Z-axis drive body 110, and the upper section of the phoresis medium container 102 is pressed against a lower surface of the phoresis medium container lid 208. The sheet 210 having viscoelasticity such as rubber is provided on a contact surface with the phoresis medium container 102 of the phoresis medium container lid 208, the sheet 210 is crushed by the Z-axis drive force of the autosampler unit 117, and the phoresis medium container 102 is sealed.

In step S20, the control section 600 drives the Y-axis drive body 109 and the Z-axis drive body 110 of the autosampler unit 117 again, after which the capillary head 403 and the SUS pipe 407 of the capillary array 101 are respectively inserted into the positive-electrode-side washing tank 203 and the negative-electrode-side washing tank 205. Accordingly, the capillary head 403 and the SUS pipe 407 are washed.

In step S21, the control section 600 drives the Y-axis drive body 109 and the Z-axis drive body 110 of the autosampler unit 117, after which the capillary head 403 and the SUS pipe 407 of the capillary array 101 are respectively inserted into the positive-electrode-side electrophoresis buffer solution tank 202 and the negative-electrode-side electrophoresis buffer solution tank 206. Since the capillary array becomes unusable when dried, the capillary head 403 is inserted into the positive-electrode-side electrophoresis buffer solution tank 202 and stands by when the phoresis operation is not performed.

One analysis is completed by analyzing the data detected by this series of movements. When continuous analysis is performed, the X-axis drive body 111 on the sample tray 112 is driven, a position of the sample container 105 is switched, and the above-described operation is repeated.

In the above-described operation procedure for analysis, long time is required for step S15 and step S19. Therefore, it is important to prevent the buffer solution and the phoresis medium from evaporating in step S15 and step S19.

Here, when a height of the positive-electrode-side buffer solution container is different from that of the phoresis medium container, for example, at a sample introduction position, when the height of the phoresis media container is lower than that of the positive-electrode-side buffer solution container, in some cases, the lid mechanism of the phoresis medium container interferes with the positive-electrode-side buffer solution container, and the autosampler cannot rise to a predetermined position. Here, it is possible to cope with a container having a different height by providing a displacement absorbing mechanism in the phoresis medium container lid 208.

As described above, according to the electrophoresis device of the embodiment, it is possible to prevent evaporation of the solution while using a container provided with a hole in the upper section for penetrating the capillary head 403. Evaporation can be efficiently prevented without changing a series of analysis flows.

The present invention is not limited to the above-described embodiment, but includes various modifications. For example, the embodiment has been described in detail for easy understanding of the present invention, and is not necessarily limited to those including all the described configurations. It is possible to replace a part of the configuration of one embodiment with the configuration of another embodiment, and it is also possible to add the configuration of another embodiment to the configuration of one embodiment. It is possible to add, delete, and replace other configurations with respect to a part of the configuration of each embodiment.

REFERENCE SIGNS LIST

101: capillary array
102: phoresis medium container
103: positive-electrode-side buffer solution container
104: negative-electrode-side buffer solution container
105: sample container
106: solution-delivering mechanism
108: sampler base
109: Y-axis drive body
110: Z-axis drive body
111: X-axis drive body
112: sample tray
113: thermostat oven unit
114: electrode
115: opening and closing door
116: irradiation detection unit
117: autosampler unit
118: irradiation detection and thermostat oven unit
201: positive-electrode-side sample introduction buffer solution tank
202: positive-electrode-side electrophoresis buffer solution tank
203: positive-electrode-side washing tank
204: waste solution tank
205: negative-electrode-side washing tank
206: negative-electrode-side electrophoresis buffer solution tank
207: positive-electrode-side buffer solution container lid
208: phoresis medium container lid
209, 210: viscoelastic sheet
301: guide
302: plunger
401: capillary
402: detection unit
403: capillary head
406: load header
407: SUS pipe
501: syringe
503: rubber plug
504: cap
506: phoresis medium
508: through hole

The invention claimed is:
1. An electrophoresis device, comprising:
a sample tray on which a positive-electrode-side buffer solution container containing a buffer solution and a phoresis medium container containing a phoresis medium are placed, and which is driven in a vertical direction and a horizontal direction;
a thermostat oven unit that holds a capillary array having a capillary head in which a plurality of capillaries are bundled in a single unit at one end thereof in a state where the capillary head protrudes downward, and that keeps an interior temperature constant;
a plunger pump for delivering the phoresis medium in the phoresis medium container to the capillary array from the capillary head; and
a power source for applying a voltage to both ends of the capillary array, wherein
holes for insertion of the capillary head are provided in an upper section of the positive-electrode-side buffer solution container and an upper section of the phoresis medium container,
the thermostat oven unit includes a first lid member that is positioned above the sample tray and seals the upper section of the positive-electrode-side buffer solution container while the phoresis medium is being delivered by the plunger pump, and
the thermostat oven unit includes a thermostat oven main body and an opening and closing door, and the first lid member is provided on the opening and closing door.

2. The electrophoresis device according to claim 1, wherein
the upper section of the positive-electrode-side buffer solution container is sealed by driving the sample tray upward, and pressing the positive-electrode-side buffer solution container against the first lid member.

3. The electrophoresis device according to claim 1, wherein
the first lid member includes a viscoelastic sheet on a lower surface thereof.

4. The electrophoresis device according to claim 1, wherein
the positive-electrode-side buffer solution container includes a plurality of buffer solution tanks partitioned from each other.

5. The electrophoresis device according to claim 1, wherein
the thermostat oven unit includes a second lid member for sealing the upper section of the phoresis medium container while electrophoresis is performed by applying the voltage from the power source.

6. The electrophoresis device according to claim 5, wherein
the upper section of the phoresis medium container is sealed by driving the sample tray upward and pressing the phoresis medium container against the second lid member.

7. The electrophoresis device according to claim 5, wherein
the second lid member includes a viscoelastic sheet on a lower surface thereof.

8. The electrophoresis device according to claim 5, wherein
the second lid member is provided on the thermostat oven main body.

9. The electrophoresis device according to claim 5, wherein
the second lid member is provided on the opening and closing door.

10. An electrophoresis device, comprising:
a sample tray on which a positive-electrode-side buffer solution container containing a buffer solution and a phoresis medium container containing a phoresis medium are placed, and which is driven in a vertical direction and a horizontal direction;
a thermostat oven unit that holds a capillary array having a capillary head in which a plurality of capillaries are bundled in a single unit at one end thereof in a state where the capillary head protrudes downward, and that keeps an interior temperature constant;
a plunger pump for delivering the phoresis medium in the phoresis medium container to the capillary array from the capillary head; and
a power source for applying a voltage to both ends of the capillary array, wherein
holes for insertion of the capillary head are provided in an upper section of the positive-electrode-side buffer solution container and an upper section of the phoresis medium container,
the thermostat oven unit includes a first lid member that is positioned above the sample tray and seals the upper section of the positive-electrode-side buffer solution container while the phoresis medium is being delivered by the plunger pump, and
the thermostat oven unit includes a thermostat oven main body and an opening and closing door, and the first lid member is provided on the thermostat oven main body.

* * * * *